United States Patent [19]

Schuldt

[11] 4,071,894
[45] Jan. 31, 1978

[54] PROFILE WARNING GENERATOR WITH ANTICIPATION OF WARNING CONDITION

[75] Inventor: Theodore J. Schuldt, Thousand Oaks, Calif.

[73] Assignee: Rockwell International Corporation, El Segundo, Calif.

[21] Appl. No.: 700,634

[22] Filed: June 28, 1976

[51] Int. Cl.$^2$ .................. G06F 15/50; G08G 5/00
[52] U.S. Cl. .................. 364/430; 244/180; 340/27 AT; 340/213 R
[58] Field of Search .......... 235/151.3, 150.22; 340/213 R, 248 R, 248 C, 27 R, 27 AT; 307/293; 328/1; 343/7 TA, 112 C, 112 A; 244/180, 181, 185–187; 73/178 R, 178 T

[56] References Cited

U.S. PATENT DOCUMENTS

| | | | |
|---|---|---|---|
| 3,639,844 | 2/1972 | Karklys | 307/293 |
| 3,671,875 | 6/1972 | Pento | 307/293 |
| 3,715,718 | 2/1973 | Astengo | 340/213 R |
| 3,812,333 | 5/1974 | Mineck et al. | 235/150.22 |
| 3,934,222 | 1/1976 | Bateman et al. | 340/27 AT |
| 3,936,796 | 2/1976 | Bateman | 235/150.22 |
| 3,946,358 | 3/1975 | Bateman | 235/150.22 |
| 3,947,808 | 3/1976 | Bateman | 340/27 AT |
| 3,947,810 | 3/1976 | Bateman et al. | 340/27 AT |
| 3,958,218 | 5/1976 | Bateman | 340/27 R |
| 3,958,219 | 5/1976 | Bateman et al. | 235/150.22 |

Primary Examiner—Malcolm A. Morrison
Assistant Examiner—Errol A. Krass
Attorney, Agent, or Firm—Richard W. Anderson; H. Fredrick Hamann; L. Lee Humphries

[57] ABSTRACT

A system for developing a warning condition output signal when a monitored input variable exceeds a warn profile defined value defined as a predetermined function of an input reference variable, in which the warning condition output signal is delayed by a time $\tau$ from the time that a warning condition is sensed. The profile offset thus induced is compensated for by generating an anticipated future value of the reference variable after a time $\tau$ from the instant value and rate of change thereof, with the anticipated future value being utilized to generate the warn profile. Lag introduced by filtering which might be employed in generating the anticipated value, as well as any lag time existing between a reference variable failure and a failure condition signal which may be used to inhibit development of a warning condition signal, are then permissible, and are compensated for without profile offset by choosing a delay time $\tau$ at least as great as the cumulation of these delays, and conditioning generation of a delayed warning condition signal on a warning signal condition being continuously maintained for a time at least as great as the imposed delay time $\tau$.

6 Claims, 4 Drawing Figures

PROFILE WARNING GENERATOR WITH ANTICIPATION OF WARNING CONDITION

This invention relates, generally, to warning systems wherein a warn condition indicative output is generated when a profile value generated as a function of a reference variable is exceeded by a monitored variable.

More particularly, the present invention relates to systems such as the currently employed ground proximity warning systems utilized in aircraft to provide a warning annunciation when the aircraft dynamics exceed certain profile-defined performance references. The reference variable employed in ground proximity warning systems is radio altitude and it is this reference from which the ground proximity warning system's various profiles are derived.

Due to ground proximity warning system considerations, it may be necessary to delay the annunciation of a warning from the time that a warning condition is initially sensed. For example, with radio altitude as the reference from which the ground proximity warning system profiles are derived, when the radio altitude signal fails, there can be a delay between the failure time and the time at which a ratio altitude validity (flag) signal is generated. Ordinarily, the generation of an invalid radio signal would preclude the warning signal from being generated; however, with a delay in the development of the invalidity signal from the time of the actual invalid radio condition, the warning may actually be based on bad altitude information and, as such, be classified as a nuisance warning.

In addition, signals from which the warning profiles in a ground proximity warning system are determined must be filtered (smoothed) to reduce the possibility of a nuisance warnings caused by a signal noise. Filter lag introduced delays in the radio altitude signal as employed in profile generation, cause the apparent warning condition to be offset from the desired profile.

Accordingly, the object of the present invention is to introduce a delay in the output warning to assure that warnings are based on valid signals and to compensate for the warning profile offset so introduced.

A further object of the present invention is to permit smoothing input reference variable signals in a warning system and to compensate for filter lag time which would otherwise introduce an offset in the warning profile.

The present invention is featured in utilization of means to estimate the rate of change of the reference variable and to then employ the estimated rate of change to estimate the future value of the reference at the end of a predetermined time interval. The rate of change is estimated such that it is a smooth signal and does not introduce nuisance warnings. Anticipation, as provided by the estimated rate of change, causes the warning to be based on anticipated conditions. If a warning condition is sensed continuously for the duration of an imposed warning delay time, equal to the time interval used in anticipating the reference variable future value, a warning output occurs at or very near the desired warning profile and the profile offset introduced by the delay is thereby removed.

These and other features and objects of the present invention become apparent upon reading the following description with reference to the accompanying drawing in which.

Figure 1:
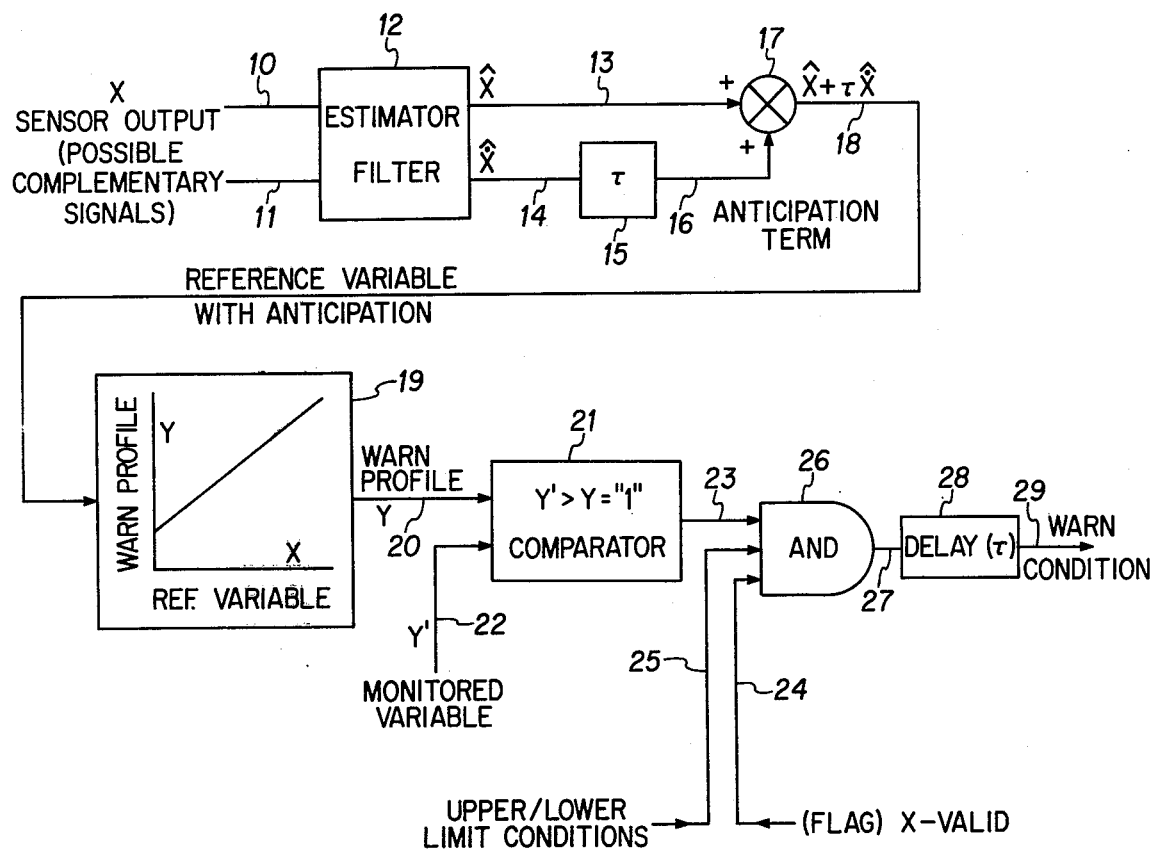
FIG. 1 is a functional block diagram of a warning condition generating system employing anticipation of a warning condition in accordance with the present invention.

The concept of the present invention of employing anticipation in a warning system is shown in FIG. 1. The reference variable of FIG. 1 is based on a sensor output 10 (such as a radio altitude signal) and upon such other complementary signals 11 as may be used to improve the estimate. The sensor output 10, and any complementary signals 11, are applied to an estimator filter 12 which may comprise a particular filtering means or employ other estimation algorithms to derive a smooth rate of change signal 14. The estimated rate of change, $\hat{X}$, of the reference variable X and the estimated reference variable, $\hat{X}$, outputs from the estimator filter 12 are utilized to calculate an anticipated future value of the independent variable X based on its existing rate of change. As such, the rate signal 14 is multiplied by a time $\tau$ by application, for example, to an operational amplifier with appropriate signal scaling to effect an output 16 therefrom defined as $\hat{X} \tau$. The reference variable output 13, and the product of the rate of change of the independent variable and $\tau$, are summed at 17 to provide a value of the reference variable with anticipation on line 18 which may be defined as $X + \tau \hat{X}$. The signal on line 18 is thus an anticipated future value of the reference variable X after some time $\tau$.

The anticipated reference variable future value, as it appears on line 18, is then utilized as the reference variable input to a profile generator 19 which defines, for each reference variable input value on line 18, a warn profile output signal 20 scaled in terms of a monitored variable. FIG. 1 depicts a particular functional relationship between the warn profile output 20 and the reference variable input value 18 as a line of particular slope with a particular Y-axis offset. The monitored variable 22 ($y'$) and the warn profile output 20 ($y$) are then applied to a comparator 21 the output 23 of which may be caused to be a logic one level when the monitored variable input 22 to the comparator exceeds the value defined by the warn profile output 20 for the particular value of the reference variable input 18. The output 23 of comparator 21 is applied to an AND gate 26 the output 27 of which comprises a warn condition output. AND gate 26 may receive futher logic inputs, such as input 24 representing independent variable validity, and input 25 which may represent imposed upper and lower limit conditions, for example, on the reference variable values which define the warn profile.

In accordance with the present invention, the output of the AND gate 27 is applied to a delay means 28 which operates, upon a warn condition initially being sensed (a logic one output from AND gate 26), to provide a delayed logic one output 29 after a predetermined period of time.

Now, if the delay imparted by delay block 28 to a warning condition as sensed by AND gate 26, be defined as $\tau$ and the calculated reference variable applied to the profile generator be based on the value of the instant reference variable at a time $\tau$ from real time, and, if a warning condition, as sensed by the output of AND gate 26, is sensed continuously for a period of time $\tau$, the warning output 29 from the delay means 28 occurs at or near the desired warning profile, and the offset introduced by the imparted delay 28 is removed. With a warn condition output 29 being generated only if a warn condition is continuously sensed by AND gate 26 for the delay time $\tau$, the warn condition output 29 will be assured of being based on good reference variable (valid) information.

By way of operational summary, the system herein described generates, from the instance value of a reference variable and the rate of change of the reference variable, the anticipated value of the reference variable in a time $\tau$. The calculated future value of the reference variable is utilized to generate a warning profile output to be compared against a monitored variable to develop a warn condition output from AND gate 26 when the profile is exceeded. The warn condition output is delayed through delay means 28 to provide a warn condition output 29, with the delay imparted by block 28 being the time $\tau$ which was utilized in generating the calculated future reference variable value.

As will be further described, the warn condition output 29 is generated at a time $\tau$ after the comparator senses a warn profile has been exceeded, and the warn condition output 29 is conditioned upon the continuous validity of the reference variable input to the profile generator for the time $\tau$. If then, the delay time $\tau$ employed in the calculation of the future reference variable value and in the imparted delay 28 is equated to the cumulation of the delays due to system filter lag time and reference variable validity warn delays, the warn condition output is compensated for all delays, and cannot be generated on the basis of invalid reference variable input. To emphasize — it is desirable that any delay between failure of the reference varible and a validity signal indicating such failure not cause a warning to be generated which is based on invalid input information. It is desired that the reference variable input be smoothed and that its rate of change be smoothed to preclude the generation of nuisance warnings. The desired warning delay to assure that warnings are generated on the basis of valid independent variable values, and those necessarily introduced by the required and desired filtering which introduces time lag, causes the apparent warning conditions to be offset from the desired profile. The present invention compensates for these delays without negating the desired effects thereof by introducing a fixed warn delay and compensating for same by utilizing a calculated future value of the reference variable for profile generation, with the net result that the warning output occurs at or near the desired warning profile, with the offset introduced by the warning delay thereby removed, and the system assured that any warn condition output is based on valid reference variable conditions the generation of the warning output upon continued validity of the reference variable over a period of time equal to the imparted delay in the system.

Figure 2:
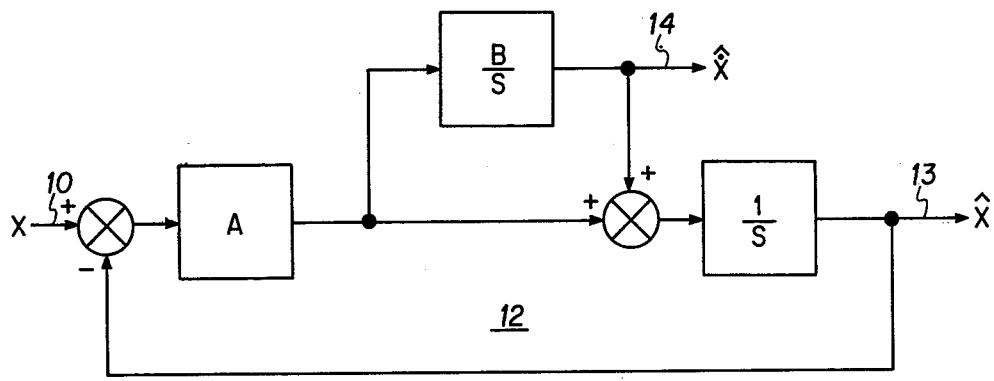
FIG. 2 is a functional diagram of a type of estimator filter usable in the system of one of FIG. 1.

Although the concept of providing anticipation, as described herein, is not dependent upon the utilization of a particular filter or estimation scheme, one such example is shown in FIG. 2, where the independent variable 10 may be applied to a second order estimator filter. The filter of FIG. 2 includes either fixed or variable filter parameter transfer function defining blocks A, B/S and (1/S) (where S is the Laplacian operator). The second order estimator filter of FIG. 2 develops an output 14 as an estimated rate of change of the reference variable input 10 and an output 13 representing a smoothed value of the reference variable input 10.

The exampled filtering scheme of FIG. 2 is referred to herein as an embodiment of the estimator block 12 of FIG. 1 to example that the reference variable input 10 referred to herein is defined as a sensor output which in itself may be sufficiently noisy to require smoothing before application to the profile generator in order that the profile generator not be caused to generate nuisance warnings based on noise perturbations on the reference variable input. The introduction of smoothing by filtering infers the introduction of time lag, and any such time lag, which ordinarily would effect an offset in the warn profile, is compensated for by the future value calculation and induced delay feature of the present invention.

Figure 3:
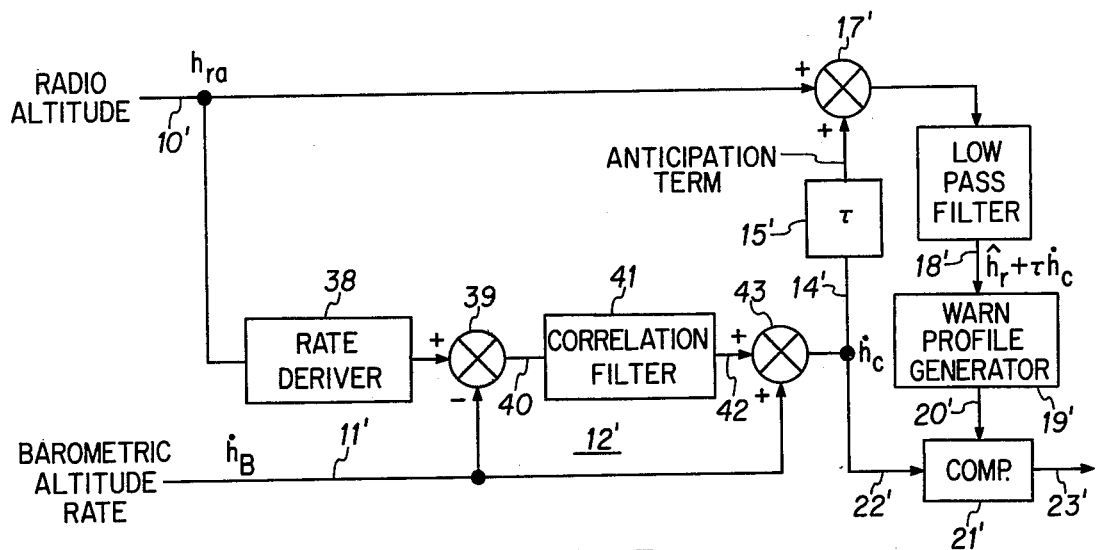
FIG. 3 is a functional diagram of the development of an anticipated reference variable by a further type of estimator filter arrangement.

FIG. 3 illustrates a further utilization of the anticipating feature of the present invention in a system as currently employed in a ground proximity warning device. In FIG. 3, the rate of change of a reference variable input (radio altitude 10') is multiplied by time $\tau$ to provide an anticipation term for summing with the radio altitude input signal. The summation is subsequently smoothed in a low-pass filter to provide a reference variable output 18 with anticipation, that is, a future value of the radio altitude input signal 10' based on its instant value and rate of change. The rate of change of the radio altitude signal of FIG. 3 employs a technique as described in copending application Ser. No. 613,380, entitled "Aircraft Ground Closure Rate Filtering Method and Means", by Ferman H. Walker, now Pat. No. 4,016,565, and assigned to the assignee of the present invention. Here, the radio altitude input signal 10' is applied to a rate deriver 38 and compared in 39 with a barometric altitude rate signal 11' to provide a signal 40 corresponding to the rate of change of the ground profile. The ground profile rate of change signal 40 is applied to a correlation filter 41 to smooth out perturbations thereon caused by ground irregularities, and subsequently added at 43 with barometric altitude rate to develop ground closure rate 14' which is indicative of the rate of change of the radio altitude input signal 10'. As concerns the present invention, this rate signal 14' is multiplied by delay time $\tau$ at 15' and added at 17' to the radio altitude input signal to develop an anticipated future value of the radio rate signal. The output from summing means 17' is smoothed in a low-pass filter, with output 18' corresponding to the calculated future value of the reference variable, provided as input to the profile generator 19'. Output 20' from the profile generator 19' is compared (in this example) with the ground closure rate signal at 14' to provide indication of a warning condition when the $h_c$ term on input 22' exceeds the profile value input 20'. Output 23' from comparator 29' might then be applied, as in FIG. 1, through a condition AND gate means based on radio altitude validity and thence to delay means 28 which imparts a delay between the warning condition so generated and that actually out-putted, in accordance with the present invention.

It is to be emphasized that, for the basic purposes of the present invention, a sensor output signal provides the reference variable signal. To avoid nuisance warning generations the reference variable signal, in all likelihood, would be filtered prior to application as the reference variable input to a warning profile generator. The rate of change of the reference variable, also desirably including smoothing, is utilized to develop an anticipated future value of the reference variable after a time $\tau$, the latter being used to generate the profile output. In any case, the imparted delay designed into the output delay function block 28 is chosen to be great enough that it at least equals the cumulation of the delay times imparted by filtering in the system and that which may exist in the system between the time occurrence of an invalid reference variable input to the system and a flag output warning (invalidity) signal annunciating the invalid condition.

Figure 4:
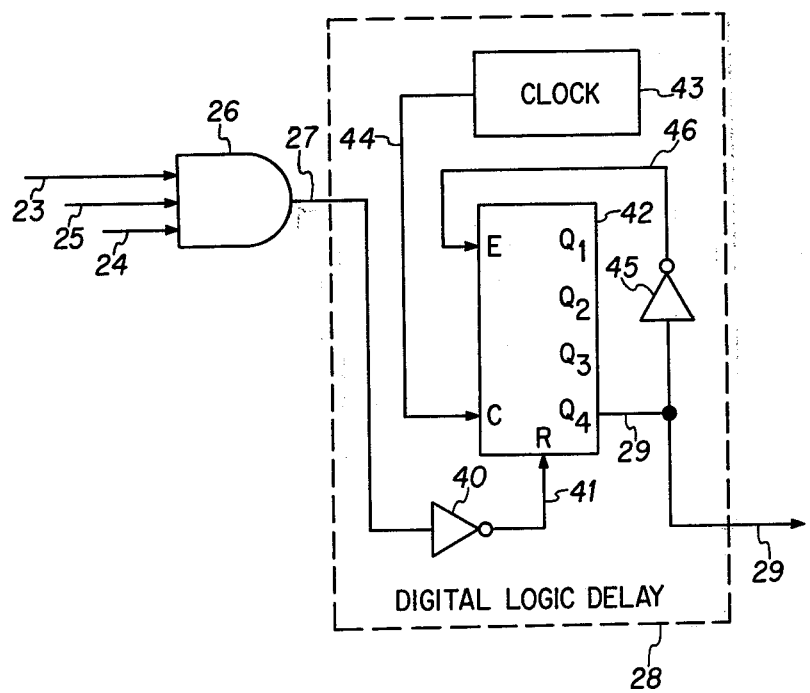
FIG. 4 is a functional schematic diagram of a digital logic delay means as might be employed in the anticipated warning condition development system of FIG. 1.

FIG. 4 illustrates a type of delay means 28 which may be employed in the present invention. AND gate 26, with its comparator, limit condition, and reference variable validity inputs, provides an output 27 to a digital logic delay circuitry 28. As described herein, it is assumed that comparator 21 of FIG. 1 develops a logic one output when the profile is exceeded, and that the flag validity input to AND gate 26 develops a logic one output when the reference variable is valid. A warning condition is then evidenced by the output 27 from AND gate 23 going to a logic one at the time the profile is exceeded (comparator 21 output goes to logic one). The output 27 from AND gate 26, in being based on a warning profile generated from the calculated future value of the independent variable at time $\tau$, represents a warning condition that generates a warning output on line 2g only if the warning condition sensed on output 27 of AND gate 26 is maintained for a period of time $\tau$, with the output 29 being delayed from the inputted condition signal 27 by this time $\tau$.

As implemented in FIG. 4, the period of time $\tau$ is sensed by a counter having had accumulated therein a predetermined count from a clock input source. As embodied in FIG. 4, a digital counter having a clock input C, a reset input R and an enable input E, as well as plural outputs Q1—Q4, is employed. The counter 42 of FIG. 4 might comprise a commercially available type MC-14518 (Motorola) or a type CD40518 (RCA). The output 27 from AND gate 26 is applied through an inverter 40 the output 41 of which applied to the reset input of counter 42. The illustrated $Q_4$ output 29 of counter 42 comprises the warn condition output 29 of the present invention, and is additionally applied through an inverter 45 as an input 46 to the enable input of counter 42. A clock source 43 provides a train of clock pulses 44 at a defined repetition rate to the clock input of counter 42. The counter clocks input clock pulses when the reset input is a logic zero and the enable input is a logic one. In the ambient (reset) condition of counter 42, all counter outputs Q1–Q4 are zero. When the output 27 from AND gate 26 goes to a logic one (herein defined as a warning condition) the inverted output 41 thereof, via inverter 40, drives the counter reset input to logic zero, allowing the counter to clock pulses as long as the enable line of the counter (here comprising the inverted output 46 of the Q4 counter output 29) is at a logic one.

If AND gate 26 maintains a logic one condition on its output 27, the reset input maintains logic zero, and the counter clock pulses 44 from counter 43 will be accumulated in the counter until a count is obtained where the Q4 output 29 of the counter goes to a logic one. This comprises a warn output condition 29. When the Q4 output goes to a logic one, it is inverted via inverter 45 and applied to the counter enable input as a logic zero to stop the count accumulation.

If the AND gate 26 output 27 goes from a logic one back to logic zero, the reset input 41 to counter 42 goes from a logic zero to a logic one via inverter 40 and the counter 42 is reset by this transition to have the counter enabled to start over from a zero count.

The warn condition output from AND gate 26 on line 27 must therefore be maintained for a time sufficient to clock the counter to that count which causes the Q4 output thereof to go to a logic one. By judicious choice of the clock repetition rate, this count corresponds to the desired delay time $\tau$.

Should any warn condition output (logic one) from AND gate 26 not be maintained for this period of time $\tau$, counter 42 is reset to zero prior to the Q4 output thereof going to a logic one, and the counter is caused to count over from zero, with no warning 29 being outputted at Q4.

It is thus seen that, in response to a warning condition (logic one) on AND gate output 27, the delay means 28 of FIG. 4 outputs a delay logic one condition at a time $\tau$ after the initiation of the warn condition output of AND gate 26, and necessitates that the warn condition output from the AND gate 26 be maintained for this period of time $\tau$. Should a warn condition output be generated by AND gate 26, and not maintained for a period of time $\tau$, the counter is reset to zero and starts a new count accumulation. The Q4 output 29 from counter 42 corresponds to a sufficient number of clocks being accumulated therein to represent the desired time $\tau$.

The implementation of FIG. 4 provides the desired delay time $\tau$ which is utilized to compensate for the offset effected in the system by filter lag times and additionally assures that any warn condition output 29 is generated on the basis of valid reference input throughout the delay time, since the time $\tau$ is chosen to be sufficient to assure that it exceeds any delay between the instant of failure of the reference variable input to the system and the time that a "flag" signal which annunciates this failure is generated.

Although the present invention has been described with respect to particular embodiments thereof, it is not to be so limited, as changes might be made therein which fall within the scope of the invention as defined in the appended claims.

I claim:

1. A system for generating an output warning condition signal when a monitored input variable exceeds a reference profile value defined by a predetermined function of an input reference variable, comprising, signal generation means receiving said reference variable as input thereto and developing from the instant value and rate of change thereof a calculated future value of said reference variable after a time interval $\tau$, said calculated future value being applied to a profile generating means to output said reference profile, comparator means receiving said monitored input variable and said reference profile value as respective inputs thereto and developing an output signal in response to said monitored input variable exceeding said reference profile value, signal delay means receiving the output from said comparator means and imparting thereto a delay equated to said time interval $\tau$, and the output of said delay means comprising said output warning condition signal.

2. The system of claim 1 wherein said signal generation means comprises rate deriving means receiving said input reference variable and developing an output proportional to the rate of change with time thereof, signal multiplying means receiving the output of said rate deriving means and multiplying same by said time $\tau$, and means for summing the outputs of said signal multiplying means with said reference input signal, the output of said means or summing comprising said calculated future value of said reference variable.

3. The system of claim 2, with said signal generation means further comprising low-pass filtering means imparting a predetermined lag time to the calculated future value of said reference variable outputted thereby, and said time interval $\tau$ being at least as great as said lag time.

4. The system of claim 3, with logic gating means receiving the output of said signal comparator means and a reference variable validity indicative signal as respective inputs thereto and selectively gating the output of said comparator means to said signal delay means under conditions of reference variable validity, with a further time delay between a failure condition of said reference variable and indication of said failure condition by loss of said validity indication signal, and said time interval $\tau$ being at least as great as the cumulation of said filter induced lag time and said further time delays.

5. The system of claim 4 with said delay means including means precluding an output therefrom for signals inputted thereto having time durations less than said time interval $\tau$.

6. The system of claim 5, wherein said delay means comprises a digital counter, a clock source applied to the clock input of said counter, means for resetting said counter to zero upon termination of a warning condition definitive signal logic level inputted thereto, said warning condition output comprising a predetermined Q output from said counter, and means responsive to said predetermined Q output to inhibit application of clock pulses to said counter.

* * * * *

UNITED STATES PATENT OFFICE
CERTIFICATE OF CORRECTION

PATENT NO. : 4,071,894
DATED : January 31, 1978
INVENTOR(S) : Theodore J. Schuldt It is certified that error appears in the above-identified patent and that said Letters Patent are hereby corrected as shown below:

Column 1, Line 53, insert --variable-- between "reference" and "at"
Column 3, Line 39, delete "varible" and add --variable--; Line 59, insert --by conditioning-- between the words "conditions" and "the"
Column 4, Line 60, delete "condition" and insert --conditioned--
Column 5, Line 30, delete "2g" and insert --29--
Column 6, Line 22, delete "delay" and insert --delayed--; Line 38, insert --variable-- between the words "reference" and "input"

IN THE CLAIMS:

Column 7, line 8, insert --variable-- between "reference" and "input"
Column 7, line 9, delete "or" and insert --for--

Signed and Sealed this

Thirtieth Day of May 1978

[SEAL]

Attest:

RUTH C. MASON
Attesting Officer

LUTRELLE F. PARKER
Acting Commissioner of Patents and Trademarks